US008682870B1

(12) United States Patent
Gardner et al.

(10) Patent No.: US 8,682,870 B1
(45) Date of Patent: Mar. 25, 2014

(54) DEFRAGMENTATION DURING MULTIPHASE DEDUPLICATION

(71) Applicant: Storagecraft Technology Corporation, Draper, UT (US)

(72) Inventors: Andrew Lynn Gardner, Salt Lake City, UT (US); Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 13/782,986

(22) Filed: Mar. 1, 2013

(51) Int. Cl.
*G06F 7/00* (2006.01)
*G06F 17/00* (2006.01)
*G06F 17/30* (2006.01)

(52) U.S. Cl.
USPC ............................ 707/692; 707/750; 707/769

(58) Field of Classification Search
USPC ......................................................... 707/692
See application file for complete search history.

(56) References Cited

U.S. PATENT DOCUMENTS

| 4,853,843 A | 8/1989 | Ecklund |
| 5,765,173 A | 6/1998 | Cane et al. |
| 5,991,858 A * | 11/1999 | Weinlander .................. 711/163 |
| 6,148,412 A | 11/2000 | Cannon et al. |
| 6,760,840 B1 | 7/2004 | Shimbo et al. |
| 6,912,629 B1 | 6/2005 | West et al. |
| 7,330,997 B1 | 2/2008 | Odom |
| 7,337,286 B1 | 2/2008 | West et al. |
| 7,447,854 B1 | 11/2008 | Cannon |
| 7,529,785 B1 | 5/2009 | Spertus et al. |
| 7,653,668 B1 | 1/2010 | Shelat et al. |
| 7,783,600 B1 | 8/2010 | Spertus et al. |
| 7,873,601 B1 | 1/2011 | Kushwah |
| 7,925,623 B2 | 4/2011 | Therrien et al. |
| 8,037,032 B2 | 10/2011 | Pershin et al. |
| 8,055,613 B1 | 11/2011 | Mu et al. |
| 8,086,569 B2 | 12/2011 | Jasrasaria |
| 8,099,572 B1 | 1/2012 | Arora et al. |
| 8,117,410 B2 | 2/2012 | Lu et al. |
| 8,131,924 B1 | 3/2012 | Frandzel et al. |
| 8,190,836 B1 | 5/2012 | Zheng et al. |
| 8,281,099 B2 | 10/2012 | Kishi |
| 8,285,681 B2 | 10/2012 | Prahlad et al. |
| 8,335,770 B2 | 12/2012 | Merchant et al. |
| 8,364,641 B2 | 1/2013 | Hirsch |
| 8,380,678 B2 | 2/2013 | Manson |
| 8,407,186 B1 | 3/2013 | Cremelie et al. |
| 2002/0073276 A1 | 6/2002 | Howard et al. |

(Continued)

OTHER PUBLICATIONS

U.S. Appl. No. 13/782,549, filed Mar. 1, 2013 titled "Multiphase Depulication".

(Continued)

*Primary Examiner* — Binh V Ho
(74) *Attorney, Agent, or Firm* — Maschoff Brennan

(57) ABSTRACT

Defragmentation during multiphase deduplication. In one example embodiment, a method of defragmentation during multiphase deduplication includes an analysis phase that includes analyzing each allocated block stored in a source storage at a point in time to determine if the block is duplicated in a vault storage, a defragmentation phase that includes reordering the duplicate blocks stored in the source storage to match the order of the duplicate blocks as stored in the vault storage, and a backup phase that is performed after completion of the defragmentation phase and that includes storing, in the vault storage, each unique nonduplicate block from the source storage.

20 Claims, 5 Drawing Sheets

(56) References Cited

U.S. PATENT DOCUMENTS

| | | |
|---|---|---|
| 2003/0105810 A1 | 6/2003 | McCroy et al. |
| 2003/0204609 A1 | 10/2003 | Anderson et al. |
| 2004/0267836 A1 | 12/2004 | Armangau et al. |
| 2005/0216665 A1* | 9/2005 | Takakuwa ............... 711/114 |
| 2005/0240813 A1 | 10/2005 | Okada et al. |
| 2006/0064416 A1 | 3/2006 | Sim-Tang |
| 2006/0173935 A1 | 8/2006 | Merchant et al. |
| 2007/0100913 A1 | 5/2007 | Sumner et al. |
| 2007/0136200 A1 | 6/2007 | Frank et al. |
| 2008/0005141 A1 | 1/2008 | Zheng et al. |
| 2008/0184001 A1 | 7/2008 | Stager |
| 2008/0208933 A1 | 8/2008 | Lyon |
| 2008/0244204 A1* | 10/2008 | Cremelie et al. ............ 711/162 |
| 2008/0307347 A1 | 12/2008 | Cisler et al. |
| 2009/0164529 A1 | 6/2009 | McCain |
| 2009/0204649 A1* | 8/2009 | Wong et al. ................ 707/204 |
| 2009/0254507 A1* | 10/2009 | Hosoya et al. ................ 706/48 |
| 2010/0076934 A1* | 3/2010 | Pershin et al. .............. 707/640 |
| 2010/0191748 A1* | 7/2010 | Martin et al. ............... 707/750 |
| 2010/0257142 A1 | 10/2010 | Murphy et al. |
| 2010/0260187 A1* | 10/2010 | Ongole et al. ......... 370/395.53 |
| 2011/0010498 A1 | 1/2011 | Lay et al. |
| 2011/0016083 A1 | 1/2011 | Patterson |
| 2011/0173605 A1* | 7/2011 | Bourne ...................... 717/176 |
| 2011/0218969 A1 | 9/2011 | Anglin et al. |
| 2011/0238775 A1* | 9/2011 | Wu et al. .................... 709/213 |
| 2011/0276737 A1* | 11/2011 | Mei et al. ................... 710/112 |
| 2012/0079221 A1 | 3/2012 | Sivasubramanian et al. |
| 2012/0109894 A1 | 5/2012 | Kishi |
| 2012/0136832 A1 | 5/2012 | Sadhwani |
| 2012/0136834 A1 | 5/2012 | Zhao |
| 2012/0150949 A1 | 6/2012 | Vijayan Retnamma et al. |
| 2012/0151586 A1* | 6/2012 | Hentunen ...................... 726/24 |
| 2012/0158660 A1* | 6/2012 | Hirsch ........................ 707/640 |
| 2012/0198219 A1* | 8/2012 | Preimesberger et al. ......... 713/2 |
| 2012/0246457 A1 | 9/2012 | Sosnosky et al. |
| 2013/0024424 A1 | 1/2013 | Prahlad et al. |
| 2013/0042083 A1 | 2/2013 | Mutalik et al. |
| 2013/0046944 A1 | 2/2013 | Domyo et al. |
| 2013/0138620 A1 | 5/2013 | Yakushev et al. |
| 2013/0179407 A1 | 7/2013 | Stoakes |

OTHER PUBLICATIONS

U.S. Appl. No. 13/782,807, filed Mar. 1, 2013 titled "Change Tracking for Multiphase Deduplication".

U.S. Appl. No. 13/782,822, filed Mar. 1, 2013 tiled "Restoring a Backup From a Deduplication Vault Storage".

U.S. Appl. No. 13/782,717, filed Mar. 1, 2013 tiled "Deduplication Vault Storage Seeding".

U.S. Appl. No. 13/782,957, filed Mar. 1, 2013 tiled "Local Seeding of a Restore Storage for Restoring a Backup From a Remote Deduplication Vault Storage".

U.S. Appl. No. 13/782,822, filed Jun. 5, 2013, Office Action.

U.S. Appl. No. 13/782,807, filed Jul. 3, 2013, Office Action.

U.S. Appl. No. 13/782,549, filed Jun. 24, 2013, Office Action.

U.S. Appl. No. 13/782,717, filed Jun. 13, 2013, Office Action.

U.S. Appl. No. 13/782,957, filed Jun. 20, 2013, Office Action.

U.S. Appl. No. 13/782,822, Oct. 10, 2013, Office Action.

U.S. Appl. No. 13/782,807, Nov. 7, 2013, Office Action.

U.S. Appl. No. 13/782,549, Oct. 7, 2013, Office Action.

U.S. Appl. No. 13/782,717, Oct. 7, 2013, Office Action.

U.S. Appl. No. 13/782,957, Nov. 15, 2013, Office Action.

* cited by examiner

DEFRAGMENTATION DURING MULTIPHASE DEDUPLICATION

FIELD

The embodiments disclosed herein relate to defragmenting a source storage prior to the storing of a backup of the source storage in a deduplication vault storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of backup storage and increase the bandwidth overhead of transporting data to the backup storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to defragmenting a source storage prior to the storing of a backup of the source storage in a deduplication vault storage. The example methods disclosed herein may be employed to reorder duplicate blocks of data, such as blocks of data included in files of common operating systems or common applications, stored in a source storage to match the order of the duplicate blocks as stored in the vault storage. Reordering duplicate blocks of data in the source storage to match the order in the vault storage may decrease the fragmentation of the data between the order in the source storage and the order in the vault storage. This reordering of blocks prior to the creation of a backup of the source storage may decrease the amount of time necessary to subsequently restore the backup to a restore storage due to a decrease in the amount of seeking that must be performed at the vault storage or the restore storage during the restore.

In one example embodiment, a method of defragmentation during multiphase deduplication includes an analysis phase that includes analyzing each allocated block stored in a source storage at a point in time to determine if the block is duplicated in a vault storage, a defragmentation phase that includes reordering the duplicate blocks stored in the source storage to match the order of the duplicate blocks as stored in the vault storage, and a backup phase that is performed after completion of the defragmentation phase and that includes storing, in the vault storage, each unique nonduplicate block from the source storage.

In another example embodiment, a method of defragmentation during multiphase deduplication includes an analysis phase that includes analyzing each allocated block stored in a source storage at a point in time to determine if the block is duplicated in a vault storage, a defragmentation phase that is performed after completion of the analysis phase and that includes reordering the duplicate blocks stored in the source storage to match the order of the duplicate blocks as stored in the vault storage, and a backup phase that is performed after completion of the defragmentation phase and that includes storing, in the vault storage, each unique nonduplicate block from the source storage.

In yet another example embodiment, a method of defragmentation during multiphase deduplication includes an analysis phase that includes analyzing each allocated block stored in a source storage that changed between a first point in time and a second point in time to determine if the block is duplicated in a vault storage, a defragmentation phase that is performed after completion of the analysis phase and that includes reordering the duplicate changed blocks stored in the source storage to match the order of the duplicate blocks as stored in the vault storage, and a backup phase that is performed after completion of the defragmentation phase and that includes storing, in the vault storage, each unique non-duplicate changed block from the source storage.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include defragmenting a source storage prior to the storing of a backup of the source storage in a deduplication vault storage. The example methods disclosed herein may be employed to reorder duplicate blocks of data, such as blocks of data included in files of common operating systems or common applications, stored in a source storage to match the order of the duplicate blocks as stored in the vault storage. Reordering duplicate blocks of data in the source storage to match the order in the vault storage may decrease the fragmentation of the data between the order in the source storage and the order in the vault storage. This reordering of blocks prior to the creation of a backup of the source storage may decrease the amount of time necessary to subsequently restore the backup to a restore storage due to a decrease in the amount of seeking that must be performed at the vault storage or the restore storage during the restore.

The term "storage" as used herein refers to computer-readable media, or some logical portion thereof such as a volume, capable of storing data in blocks. The term "block" as used herein refers to a fixed-length discrete sequence of bits. The term "run" as used herein refers to one or more blocks stored sequentially on a storage. The term "backup" when used herein as a noun refers to a copy or copies of one or more blocks from a storage. The phrase "defragmenting a source storage to match a vault storage" or phrases equivalent thereto as used herein refer to reordering blocks stored in the source storage to match the order of duplicate blocks as stored in the vault storage. This "defragmenting of a source storage" is distinct from file-centric defragmenting where blocks that make up a file that are initially stored in a storage in a non-contiguous fashion are reordered to place the blocks in a physically contiguous order in the storage. While "defragmenting of a source storage" may result in file-centric defragmentation, especially where blocks from matching files have been previously stored in the vault stored in a file-centric defragmented fashion, "defragmenting of a source storage" can generally be accomplished without regard to which file any particular block belongs. It is understood, of course, that a file-centric defragmentation of a source storage may additionally be performed prior to the "defragmenting of a source storage" disclosed herein in order to place nonduplicate blocks in a file-centric defragmented order so that the nonduplicate blocks are stored in the vault storage in a contiguous order such that when identical blocks are reordered in other source storages (from identical files stored in the other source storages, for example) during the "defragmenting" of the other source storages, the identical blocks will be reordered in a file-centric defragmented fashion.

Figure 1:
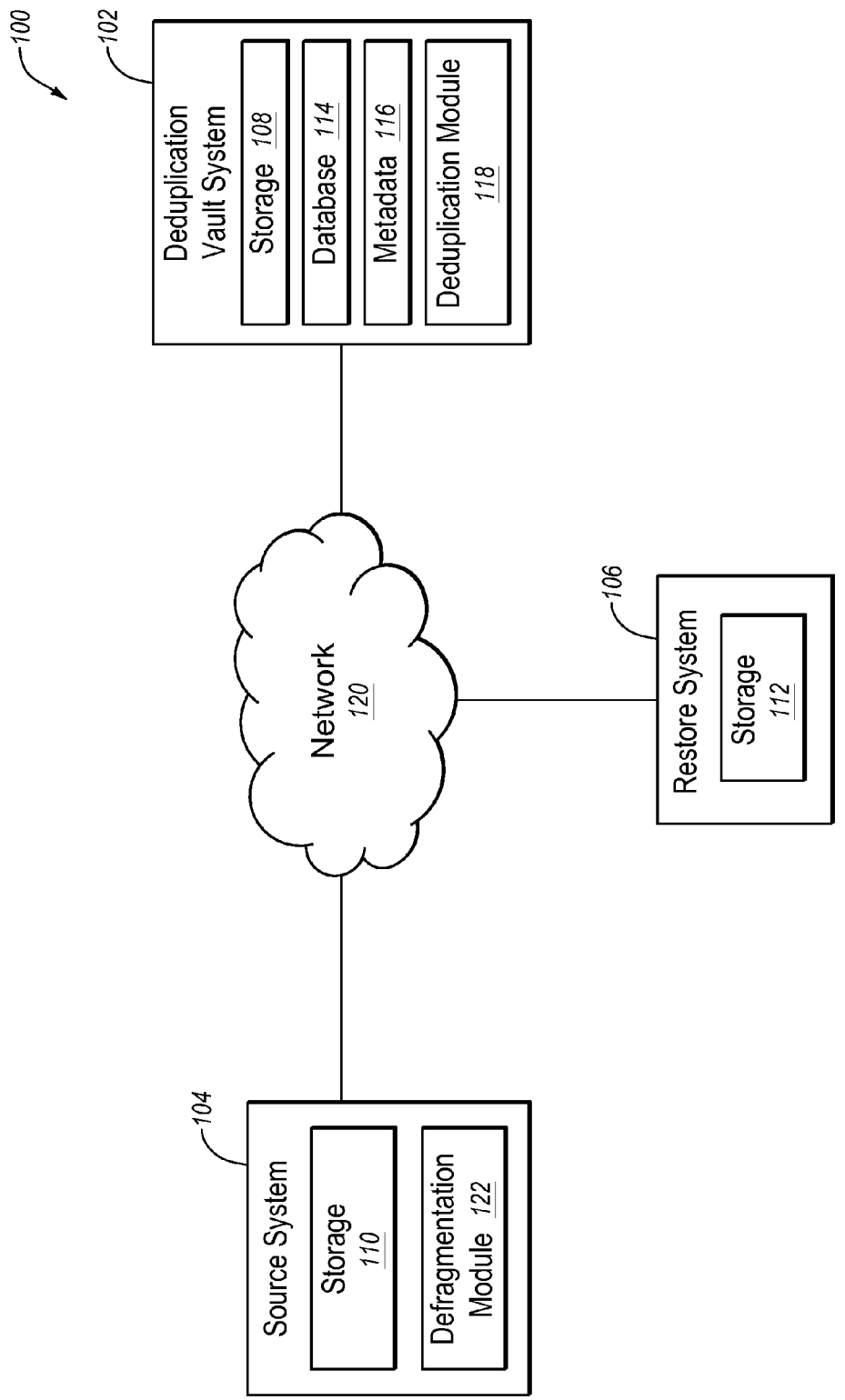
FIG. 1 is a schematic block diagram illustrating an example deduplication backup system.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, and a deduplication module 118. The source system 104 also includes a defragmentation module 122. The systems 102, 104, and 106 are able to communicate with one another over a network 120.

Each system 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

During performance of the example methods disclosed herein, the deduplication module 118 may analyze, during one phase, the allocated blocks stored in the source storage 110 at a point in time to determine if the allocated blocks are already duplicated in the vault storage 108. Then, the defragmentation module 122 may reorder, during a subsequent phase, duplicate blocks of data, such as blocks of data included in files of common operating systems or common applications, stored in a source storage 110 to match the order of the duplicate blocks stored in the vault storage 108. Then, the deduplication module 118 may backup, during another subsequent phase, those blocks from the source storage 110 that do not already have duplicate blocks stored in the vault storage 108.

The database 114 and the metadata 116 may be employed to track information related to the source storage 110, the vault storage 108, and the backup of the source storage 110 that is stored in the vault storage 108. For example, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety. Subsequently, the deduplication module 118 may restore, during yet another subsequent phase, each block that was stored in the source storage 110 at the point in time to the restore storage 112 as previously reordered during the reordering by the defragmentation module 122.

As discussed in greater detail below, reordering duplicate blocks stored in the source storage 110 to match the order of the duplicate blocks as stored in the vault storage 108 may decrease the fragmentation of the blocks between the order in the source storage 110 and the order in the vault storage 108. This reordering of blocks prior to the creation of a backup of the source storage 110 may decrease the amount of time necessary to subsequently restore the backup to the restore storage 112 due to a decrease in the amount of seeking that must be performed at the vault storage 108 or the restore storage 112 during the restore.

In one example embodiment, the deduplication vault system 102 may be a file server, the source system 104 may be a first desktop computer, the restore system 106 may be a second desktop computer, and the network 120 may include the internet. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, or 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time. Further, although the deduplication module 118 and the defragmentation module 122 are the only modules disclosed in the example deduplication backup system 100 of FIG. 1, it is understood that the functionality of the modules 118 and 122 may be replaced or augmented by one or more similar modules residing on any of the systems 102, 104, and 106. Finally, although only a single source storage and a single restore storage are disclosed in the example deduplication backup system 100 of FIG. 1, it is understood that the deduplication vault system 102 of FIG. 1 is configured to simultaneously back up or restore multiple source storages. For example, the greater the number of storages that are backed up to the vault storage 108 of the deduplication vault system 102, the greater the likelihood for reducing redundancy and overall size of the data being backed up, resulting in corresponding decreases in the bandwidth overhead of transporting data to the backup storage.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
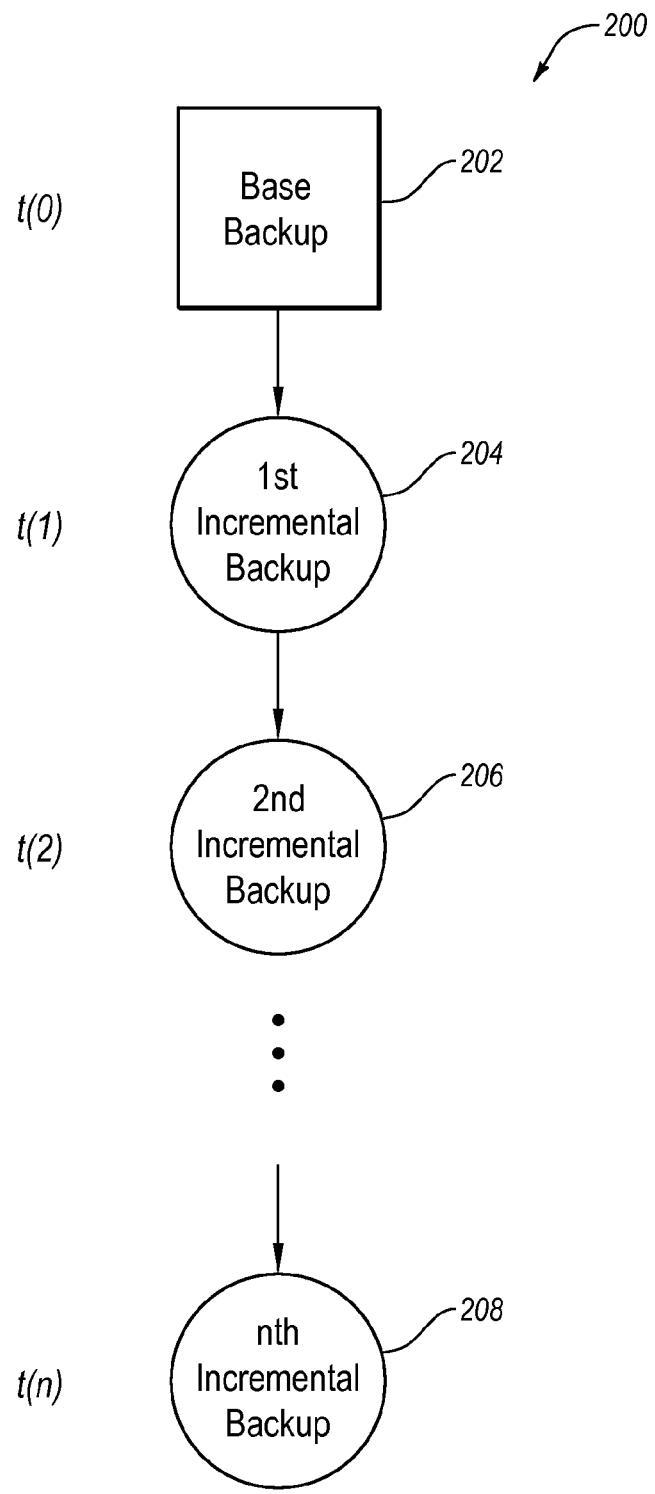
FIG. 2 is a schematic flowchart illustrating an example method for creating a base backup and multiple incremental backups of a source storage.

FIG. 2 is a schematic flowchart illustrating an example method 200 for creating a base backup and multiple incremental backups of a source storage. The method 200 may be implemented, in at least some embodiments, by the deduplication module 118 of the deduplication vault system 102 of FIG. 1. For example, the deduplication module 118 may be configured to execute computer instructions to perform operations of creating a base backup and multiple incremental backups of the source storage 110, as represented by one or more of steps 202-208 of the method 200. Although illustrated as discrete steps, various steps may be divided into additional steps, combined into fewer steps, or eliminated, depending on the desired implementation. The method 200 will now be discussed with reference to FIGS. 1 and 2.

The method 200 may begin at step 202, in which a base backup is created to capture the state at time t(0). For example, the deduplication module 118 may create a base backup of all allocated blocks of the source storage 110 as allocated at time t(0) and store the allocated blocks in the vault storage 108. The state of the source storage 110 at time t(0) may be captured using snapshot technology in order to capture the data stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the vault storage 108.

At steps 204 and 206, 1st and 2nd incremental backups are created to capture the states at times t(1) and t(2), respectively. For example, the deduplication module 118 may create a 1st incremental backup of only changed allocated blocks of the source storage 110 present at time t(1) and store the changed allocated blocks in the vault storage 108, then later create a 2nd incremental backup of only changed allocated blocks of the source storage 110 present at time t(2) and store the changed allocated blocks in the vault storage 108. The states of the source storage 110 at times t(1) and t(2) may again be captured using snapshot technology, thus avoiding downtime of the source storage 110. Each incremental backup includes only those allocated blocks from the source storage 110 that were changed after the time of the previous backup. Thus, the 1st incremental backup includes only those allocated blocks from the source storage 110 that changed between time t(0) and time t(1), and the 2nd incremental backup includes only those allocated blocks from the source storage 110 that changed between time t(1) and time t(2). In general, as compared to the base backup, each incremental backup may take a relatively short time to create and consume a relatively small storage space in the vault storage 108.

At step 208, an nth incremental backup is created to capture the state at time t(n). For example, the deduplication module 118 may create an nth incremental backup of only changed allocated blocks of the source storage 110 present at time t(n), using snapshot technology, and store the changed allocated blocks in the vault storage 108. The nth incremental backup includes only those allocated blocks from the source storage 110 that changed between time t(n) and time t(n−1).

As illustrated in the example method 200, incremental backups may be created on an ongoing basis. The frequency of creating new incremental backups may be altered as desired in order to adjust the amount of data that will be lost should the source storage 110 experience corruption of its stored data or become unavailable at any given point in time. The data from the source storage 110 can be restored to the state at the point in time of a particular incremental backup by applying the backups from oldest to newest, namely, first applying the base backup and then applying each successive incremental backup up to the particular incremental backup.

Although only allocated blocks are backed up in the example method 200, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only a base backup and incremental backups are created in the example method 200, it is understood that the source storage 110 may instead be backed up by creating a base backups and decremental backups. Decremental backups are created by initialing creating a base backup to capture the state at a previous point in time, then updating the base backup to capture the state at a subsequent point in time by modifying only those blocks in the base backup that changed between the previous and subsequent points in time. Prior to the updating of the base backup, however, the original blocks in the base backup that correspond to the changed blocks are copied to a decremental backup, thus enabling restoration of the source storage 110 at the previous point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the creation of backups as disclosed herein is not limited to a base backup and incremental backups but may also include a base backup and decremental backups.

Figure 3:
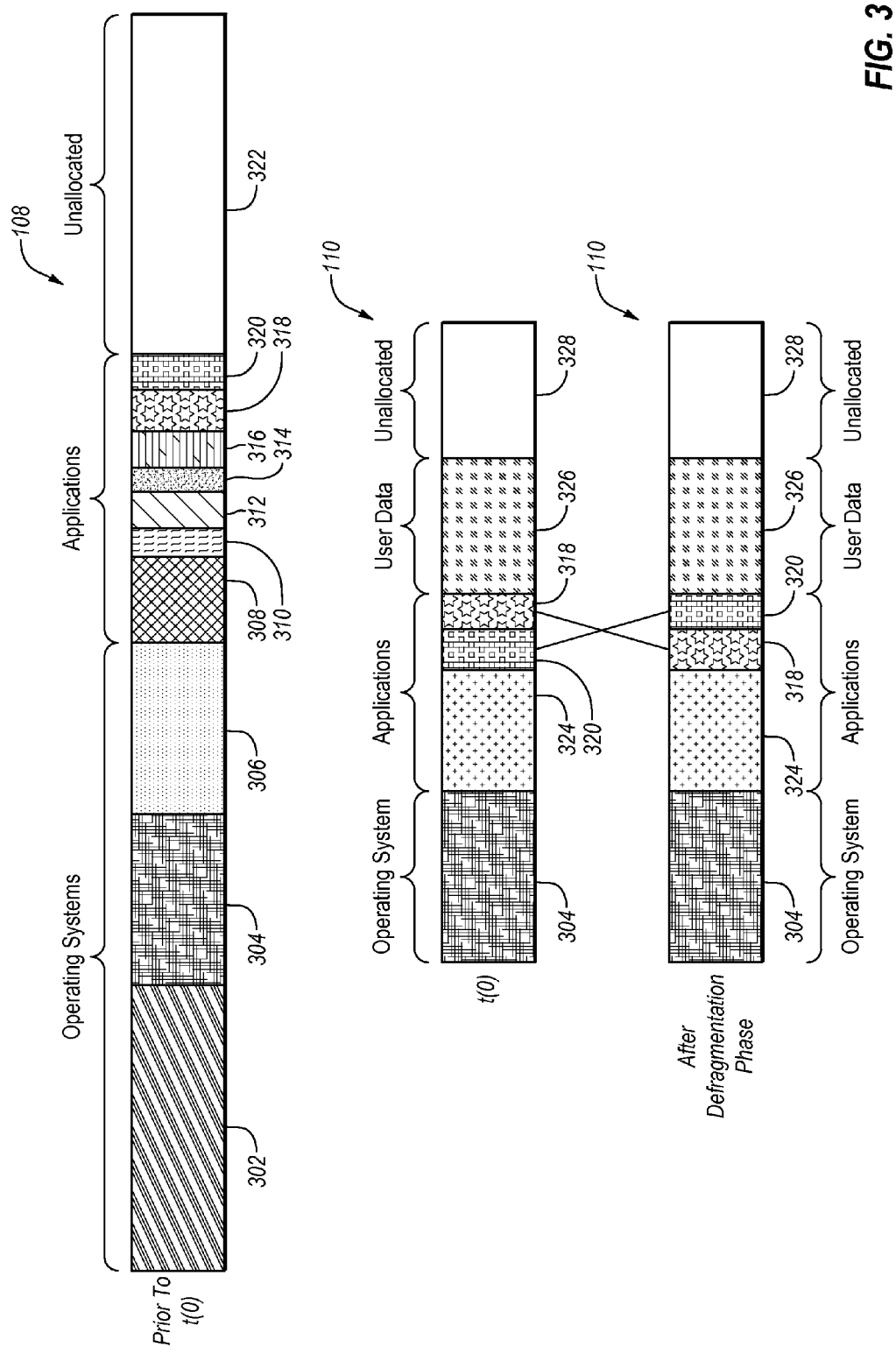
FIG. 3 is a schematic block diagram illustrating an example vault storage and an example source storage both before and after performance of a defragmentation phase.
Figure 5:
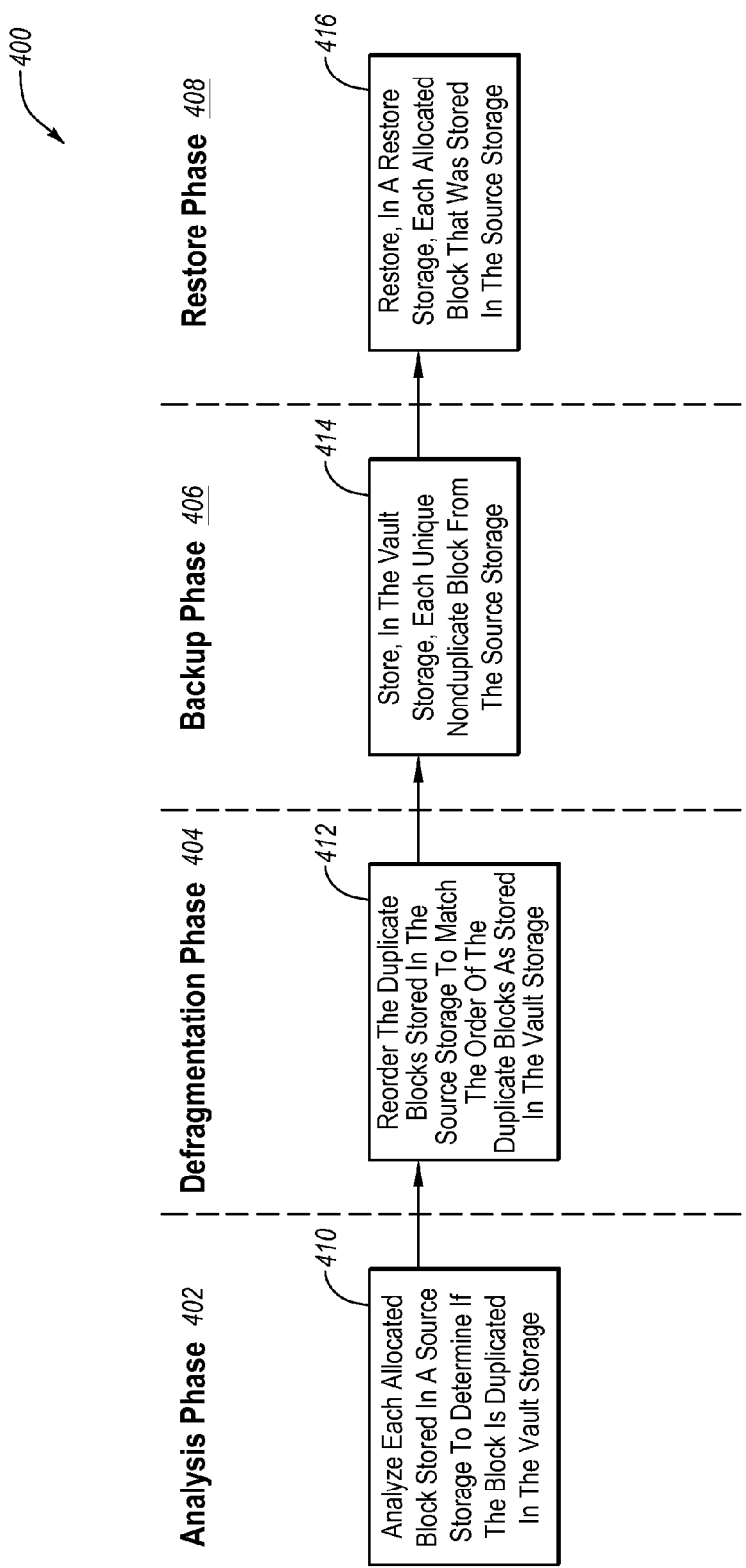
FIG. 5 is a schematic flowchart diagram of an example method of defragmentation during multiphase deduplication.

FIG. 3 is a schematic block diagram illustrating the example vault storage 108 and the example source storage 110 both before and after performance of a defragmentation phase, such as the defragmentation phase 404 disclosed herein in connection with FIG. 5. The defragmentation of the source storage 110 may be performed, in at least some embodiments, by the defragmentation module 122 of the source system 104 of FIG. 1. For example, the defragmentation module 122 may be configured to execute computer instructions to perform an operation of defragmenting the source storage 110 prior to the storing of a backup of the source storage 110 in the deduplication vault storage 108.

As disclosed in FIG. 3, the vault storage 108 and the source storage 110 are each partitioned into a physical layout of runs 302-328. Each of the runs 302-328 includes multiple blocks. In some example embodiments, the size of each block is 4096 bytes, although any other block size could instead be employed. The size of each block may be configured to match the standard sector size of a file system of the vault storage 108 and the source storage 110. In some example embodiments, the total number of blocks in the vault storage 108 may be greater than the total number of blocks in the source storage 110 in order to allow multiple storages to be backed up in the vault storage 108. In some example embodiments, the vault storage 108 and the source storage 110 may each have millions or even billions of blocks, or more. The blank runs 322 and 328 illustrated in FIG. 3 represent unallocated blocks. Each run illustrated with a unique pattern in FIG. 3 represents a unique run of allocated blocks.

As disclosed in FIG. 3, prior to the time t(0) of the backup of the source storage 110, the vault storage 108 may have already had blocks of data stored therein from other source storage backups. Alternatively or additionally, the vault storage 108 may have been seeded prior to time t(0) with common blocks of data. For example, the vault storage 108 may have been seeded with runs 302, 304, and 306, which each makes up the files of a common operating system. The runs 302, 304, and 306 may each be stored in the vault storage 108 in the sequence of a clean install of the operating system. In this example, where each block is 4096 bytes in length, the run 302 may include the 2,621,440 blocks that make up a clean install of the 10 gigabytes of files of the WINDOWS® 7 operating system, the run 304 may include the 1,572,864 blocks that make up a clean install of the 6 gigabytes of files of the Linux 3.6.6 operating system, and the run 306 may include the 2,359,296 blocks that make up a clean install of the 9 gigabytes of files of the WINDOWS® 8 operating system. It is understood that the gigabyte sizes listed in this example are estimates only.

In addition, the vault storage 108 may have been seeded with runs 308-320, which each makes up the files of a common software application. The runs 308-320 may each be stored in the vault storage 108 in the sequence of a clean install of the software application. Continuing with the example above, the run 308 may include the 786,432 blocks that make up a clean install of the 3 gigabytes of files of the MICROSOFT® Office 2010 software application, and each run 310-320 may include the blocks that make up a clean install of the files of the Adobe Photoshop Elements 11 software application, the Norton Internet Security 2013 software application, the Quicken Deluxe 2013 software application, the QuickBooks Pro 2013 software application, the Adobe Reader software application, and the Firefox Browser software application, respectively.

Continuing with the above example, the source storage 110 includes a clean install of the Linux 3.6.6 operating system included in the run 304, a clean install of the Adobe Reader software application included in the run 318, and a clean install of the Firefox Browser software application included in the run 320. Each of the runs 304, 318, and 320 stored in the source storage 110 at time t(0) is identical to the runs 304, 318, and 320 that were stored in the vault storage 108 prior to the time t(0) during the seeding of the vault storage 108. Thus, at the time of the creation of a backup of the source storage 110 at time t(0), all of the blocks in the runs 304, 318, and 320 are already duplicated in the vault storage 108. In this example, the seeding of the vault storage 108 with the runs 304, 318, and 320 that make up the files of a common operating system and common software applications, prior to the backing up of the source storage 110 at time t(0), results in an increase in the number of blocks from the source storage 110 that are already duplicated in the vault storage 108. Therefore, during the creation of a base backup of the source storage 110 to capture the state at time t(0), all allocated blocks of the source storage 110 do not need to be transported from the source storage 110 to the vault storage 108. Instead, only the nonduplicate blocks in the runs 324 and 326 need to be transported, and the duplicate blocks in the runs 304, 318, and 320 do not need to be transported. Thus, the seeding of the vault storage 108 results in decreased bandwidth overhead, due to transporting fewer blocks, and increased efficiency and speed during the creation of the backup. Further, seeding the vault storage 108 with each of the runs 304, 318, and 320 in the sequence of a clean install may further increase the efficiency and speed during the restoration of the backup. Additional details regarding the seeding of the vault storage 108 are disclosed in related U.S. patent application Ser. No. 13/782,717, titled "DEDUPLICATION VAULT STORAGE SEEDING," which was filed on Mar. 1, 2013 and is expressly incorporated herein by reference in its entirety.

It is further understood that the above implementation of seeding a storage is but one example implementation of the order in which common blocks may be positioned during seeding. In other implementations, blocks from common operating system files may be positioned next to blocks from common software application files, instead of seeding the storage with blocks from common operating system files separately from blocks from common software application files. For example, blocks from a common WINDOWS® operating system may be positioned next to blocks from common WINDOWS® software application files, and blocks from a common Linux operating system may be positioned next to blocks from common Linux software application files, and the WINDOWS® and Linux blocks may be separated with unallocated blocks for future seeding. Therefore, common blocks may be positioned in various orders during the seeding of a storage, for example to match the positioning of the common blocks in source storages.

As disclosed in FIG. 3, not all of the duplicate runs stored in the source storage 110 are stored in the same order as the duplicate runs stored in the vault storage 108. For example, the duplicate run 320 is stored before the duplicate run 318 in the source storage 110, while the duplicate run 320 is stored after the duplicate run 318 in the vault storage 108. This fragmentation between the vault storage 108 and the source storage 110 may result in an increase in the amount of seeking performed at the time of a restore of the source storage. To avoid this increase in the amount of seeking, the runs 318 and 320 may be reordered in the source storage 110 to match the order of the runs 318 and 320 as stored in the vault storage 108. For example, as disclosed in FIG. 3, this reordering may occur during a defragmentation phase, illustrated by the lines in FIG. 3, so that after the defragmentation phase the run 320 is stored after the run 318 to match the order in the vault storage 108. Then, during a subsequent restore of the source storage 110, the runs 318 and 320 can be copied to a restore storage, such as the restore storage 112 of FIG. 1, without having to switch the order of the runs 318 and 320, thus reducing seeking in the vault storage 108 or the restore storage 112.

Figure 4:
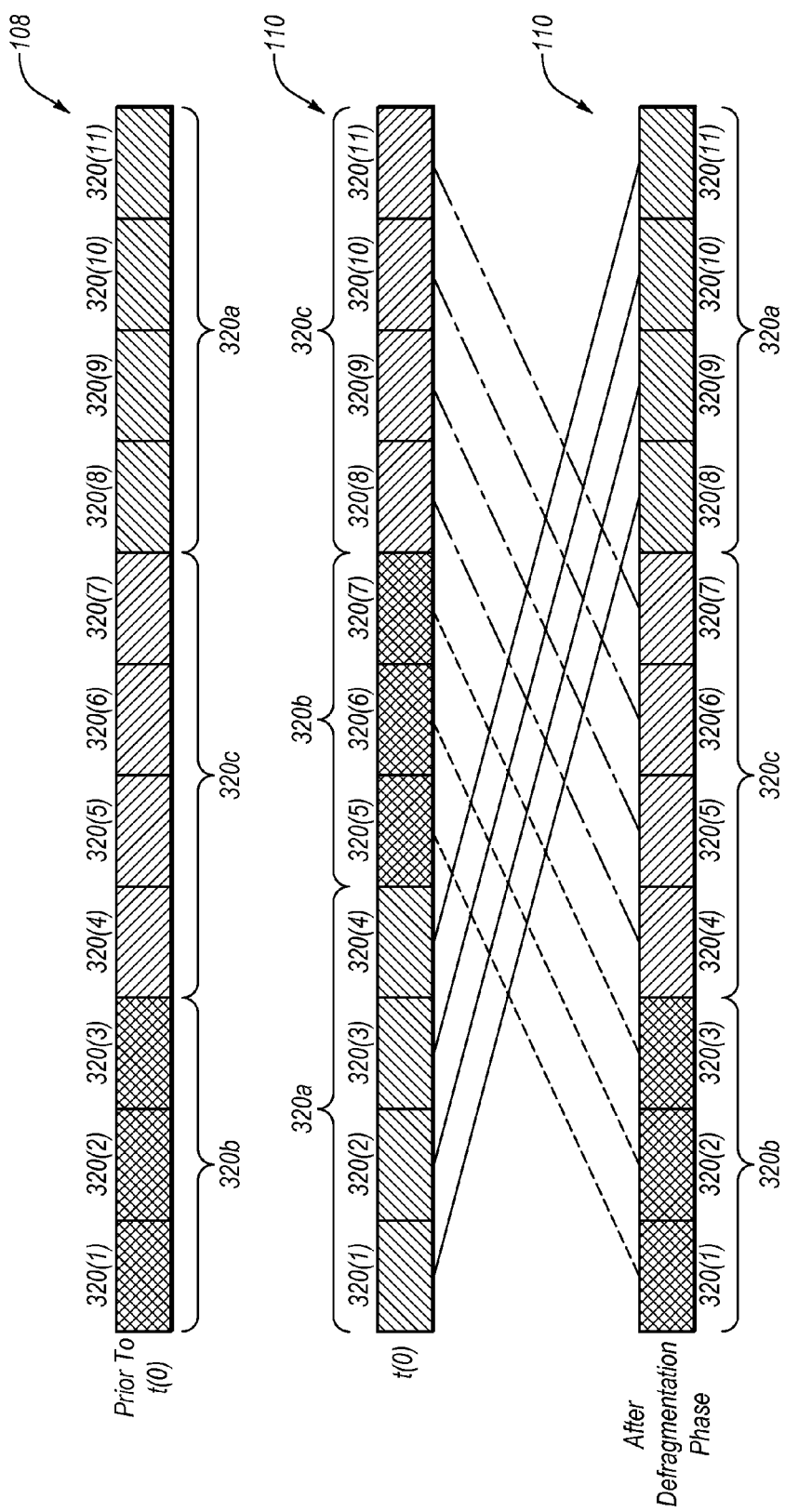
FIG. 4 is a schematic block diagram illustrating the blocks that make up files of an application stored in the example vault storage of FIG. 3 and the blocks that make up the files of the application stored in the example source storage of FIG. 3 both before and after performance of a defragmentation phase.

FIG. 4 is a schematic block diagram illustrating the blocks that make up files of an application stored in the example vault storage 108 and the blocks that make up the files of the application stored in the example source storage 110 both before and after performance of a defragmentation phase, such as the defragmentation phase 404 disclosed herein in connection with FIG. 5. The defragmentation of the source storage 110 may be performed, in at least some embodiments, by the defragmentation module 122 of the source system 104 of FIG. 1. For example, the defragmentation module 122 may be configured to execute computer instructions to perform an operation of defragmenting the source storage 110 prior to the storing of a backup of the source storage 110 in the deduplication vault storage 108.

As noted above in connection with FIG. 3, the run 320 represents a clean install of the Firefox Browser software application. Unlike the scenario disclosed in FIG. 3 where the blocks that made up the run 320 were identical and stored in an identical order in both the vault storage 108 and the source storage 110, however, in the scenario disclosed in FIG. 4 the eleven blocks that make up the run 320 are identical but are stored in a different order in the vault storage 108 than in the source storage 110. In particular, the run 320 of FIG. 4 includes runs 320a, 320b, and 320c, which each makes up a single file of a multi-file software application. In the vault storage 108, the run 320b is followed by the run 320c, and the run 320c is followed by the run 320a. In the source storage 110, in contrast, the run 320a is followed by the run 320b, and the run 320b is followed by the run 320c.

This different order may be due to the fact that even a clean install of a software application may store identical files in different orders in a storage. Therefore, even though the vault storage 108 and the source storage 110 each includes a clean install of the Firefox Browser software application, and each therefore includes the same three files made up of the runs 320a, 320b, and 320c, the installation may have stored the three files in different orders.

The fragmentation between the vault storage 108 and the source storage 110 disclosed in FIG. 4 may result in an increase in the amount of seeking performed at the time of a restore of the source storage 110. To avoid this increase in the amount of seeking, the runs 320a, 320b, and 320c may be reordered in the source storage 110 to match the order of the duplicate runs as stored in the vault storage 108. For example, as disclosed in FIG. 4, this reordering may occur during a defragmentation phase, illustrated by the lines in FIG. 4, so that after the defragmentation phase the run 320b is stored in block positions 320(1)-320(3), the run 320c is stored in block positions 320(4)-320(7), and the run 320a is stored in block positions 320(8)-320(11) in the source storage 110, which matches exactly the order of these runs in the vault storage 108. Then, during a subsequent restore of the source storage 110, the runs 320b, 320c, and 320a may be copied to a restore storage, such as the restore storage 112 of FIG. 1, without having to switch the order of the runs, thus reducing seeking in the vault storage 108 or the restore storage 112.

It is understood that although only three files are represented by the runs disclosed in FIG. 4, a software application may, in fact, include one file, two files, or more than three files. It is further understood although the three files represented by the runs disclosed in FIG. 4 each includes only three or four blocks, each file in a software application may include one block, two blocks, or more than four blocks. It is also understood that although three files are represented by the runs disclosed in FIG. 4, the systems and methods disclosed herein may not be aware that the blocks that make up each file are logically grouped as files, but may instead only be aware of the individual blocks without regard to tracking file groupings of blocks.

FIG. 5 is a schematic flowchart diagram of an example method 400 of defragmentation during multiphase deduplication. The method 400 may be implemented, in at least some embodiments, by the defragmentation module 122 of the source system 104 and the deduplication module 118 of the deduplication vault system 102 of FIG. 1. For example, the defragmentation module 122 and the deduplication module 118 may be configured to execute computer instructions to perform operations of defragmenting the source storage 110 prior to or during the creation of a backup of the source storage 110, as represented by one or more of phases 402-408 which are made up of the steps 410-416 of the method 400. Although illustrated as discrete phases and steps, various phases/steps may be divided into additional phases/steps, combined into fewer phases/steps, or eliminated, depending on the desired implementation. The method 400 will now be discussed with reference to FIGS. 1, 3, 4, and 5.

The analysis phase 402 of the method 400 may include a step 410, in which each allocated block stored in a source storage is analyzed to determine if the block is duplicated in the vault storage. For example, the deduplication module 118 may analyze each allocated block stored in a source storage 110 at time t(0) to determine if the block is duplicated in the vault storage 108. By determining which blocks stored in the source storage 110 are duplicated in the vault storage 108, the order of the duplicated blocks as stored in the vault storage 108 can also be determined.

The defragmentation phase 404 of the method 400 may include a step 412, in which the duplicate blocks stored in the source storage are reordered to match the order of the duplicate blocks stored in the vault storage. For example, the defragmentation module 122 may reorder duplicate blocks stored in the source storage 110 to match the order of the duplicate blocks stored in the vault storage 108.

As noted previously, and as illustrated in FIG. 3, these duplicate blocks may include blocks that make up one or more files of an operating system or a software application. Further, the blocks that make up the one or more files of the operating system or the software application in the vault storage 108 may be stored in the sequence of a clean install of the operating system or the software application. Further, where it is known in advance that a particular source storage will eventually be backed up to the vault storage, and the particular operating system and/or the particular software applications installed in the source storage are known, the particular operating system and/or the particular software applications can be included in the blocks stored in, or seeded into, the vault storage.

As disclosed in FIG. 3, the defragmentation module 122 may reorder duplicate runs 318 and 320 stored in the source storage 110 to match the order of the duplicate blocks stored in the vault storage 108. Alternatively, as disclosed in FIG. 3, the defragmentation module 122 may reorder duplicate runs 320a, 320b, and 320c stored in the source storage 110 to match the order of the duplicate runs 320b, 320c, and 320a as stored in the vault storage 108.

The backup phase 406 of the method 400 may include a step 414, in which each unique nonduplicate block from the source storage is stored in the vault storage. For example, the deduplication module 118 may store each block from the source storage 110, which was determined during the analysis phase 402 to be a unique nonduplicate block, in the vault storage 108.

By the conclusion of the backup phase 406, a base backup of the source storage 110 will have been stored in the vault storage 108. Unlike a standard base backup image, however, the backup of the source storage 110, as stored in the vault storage 108, will likely have been reduced in size due to the elimination of duplicate blocks within the base backup. In addition, where multiple storages are backed up into the vault storage 108, the total overall size of the backups will likely be reduced in size due to the elimination of duplicate blocks across the backups.

It is noted that the analysis phase 402, the defragmentation phase 404, and the backup phase 406 can also be employed to create an incremental backup of a storage, which will store and track only those allocated blocks in the source storage 110 that changed between a point in time of a previous backup and the point in time of the incremental backup. As used herein, any discussion of incremental backing up that only impacts allocated blocks that "changed" between a first point in time and a second point in time excludes changes due solely to the reordering of the blocks performed during the defragmentation phase 404. In particular, in the case of an incremental backup, only those allocated blocks that changed between a point in time of a previous backup and the point in time of the incremental backup, excluding changes due solely to the reordering of the blocks performed during the defragmentation phase 404, will be analyzed, defragmented, and backed up.

The restore phase 408 of the method 400 may include a step 416, in which each allocated block that was stored in the source storage is restored to a restore storage. For example, the deduplication module 118 may read, from the vault storage 108, and store, in the restore storage 112, each allocated block that was stored in the source storage 110 at time t(0) in the same position as reordered in the source storage 110 after the conclusion of the defragmentation phase 404. At the conclusion of the restore phase 408, the backup of the source storage 110 will be restored to the restore storage 112, such that the restore storage 112 will be identical to the state of the source storage 110 at the conclusion of the defragmentation phase 404.

Also, as noted previously in connection with FIGS. 3 and 4, since the defragmentation phase 404 results in the order of the duplicate blocks in the source storage 110 being reordered to match the order of the duplicated blocks as stored in the vault storage 108, the amount of time necessary to subsequently restore the backup to the restore storage 112 may be decreased due to a decrease in the amount of seeking that must be performed at the vault storage 108 or the restore storage 112 during the restore.

The analysis phase 402, the backup phase 406, and the restore phase 408 may be accomplished, for example, by performing the steps of the analysis phase 802, the backup phase 804, and the restore phase 806 disclosed in related U.S. patent application Ser. No. 13/782,549 referenced above.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

What is claimed is:

1. A method of defragmentation during multiphase deduplication, the method comprising:
   an analysis phase that includes analyzing each allocated block stored in a source storage at a point in time to determine if the block is duplicated in a vault storage;
   a defragmentation phase that includes reordering the duplicate blocks stored in the source storage to match the order of the duplicate blocks as stored in the vault storage; and
   a backup phase that is performed after completion of the defragmentation phase and that includes storing, in the vault storage, each unique nonduplicate block from the source storage.

2. The method as recited in claim 1, wherein the duplicate blocks include blocks that make up one or more files of an operating system.

3. The method as recited in claim 2, wherein the one or more files of the operating system are stored in the vault storage in the sequence of a clean install of the operating system.

4. The method as recited in claim 2, wherein the operating system is installed in the source storage.

5. The method as recited in claim 1, wherein the duplicate blocks include blocks that make up one or more files of a software application.

6. The method as recited in claim 5, wherein the one or more files of the software application are stored in the vault storage in the sequence of a clean install of the software application.

7. The method as recited in claim 5, wherein the software application is installed in the source storage.

8. The method as recited in claim 1, further comprising a restore phase which includes reading, from the vault storage, and storing, in a restore storage, each allocated block that was stored in the source storage at the point in time in the same position as stored in the source storage after the completion of the defragmentation phase.

9. A non-transitory computer-readable medium storing a program that causes a processor to execute the method as recited in claim 1.

10. A method of defragmentation during multiphase deduplication, the method comprising:
    an analysis phase that includes analyzing each allocated block stored in a source storage at a point in time to determine if the block is duplicated in a vault storage;
    a defragmentation phase that is performed after completion of the analysis phase and that includes reordering the duplicate blocks stored in the source storage to match the order of the duplicate blocks as stored in the vault storage; and
    a backup phase that is performed after completion of the defragmentation phase and that includes storing, in the vault storage, each unique nonduplicate block from the source storage.

11. The method as recited in claim 10, wherein the duplicate blocks include blocks that make up one or more files of an operating system that is installed in the source storage.

12. The method as recited in claim 11, wherein the one or more files of the operating system are stored in the vault storage in the sequence of a clean install of the operating system.

13. The method as recited in claim 10, wherein the duplicate blocks include blocks that make up one or more files of a software application that is installed in the source storage.

14. The method as recited in claim 13, wherein the one or more files of the software application are stored in the vault storage in the sequence of a clean install of the software application.

15. The method as recited in claim 10, further comprising a restore phase which includes reading, from the vault storage, and storing, in a restore storage, each allocated block that was stored in the source storage at the point in time in the same position as stored in the source storage after the completion of the defragmentation phase.

16. A non-transitory computer-readable medium storing a program that causes a processor to execute the method as recited in claim 10.

17. A method of defragmentation during multiphase deduplication, the method comprising:
    an analysis phase that includes analyzing each allocated block stored in a source storage that changed between a first point in time and a second point in time to determine if the block is duplicated in a vault storage;
    a defragmentation phase that is performed after completion of the analysis phase and that includes reordering the duplicate changed blocks stored in the source storage to match the order of the duplicate blocks as stored in the vault storage; and
    a backup phase that is performed after completion of the defragmentation phase and that includes storing, in the vault storage, each unique nonduplicate changed block from the source storage.

18. The method as recited in claim 17, wherein:
    the duplicate blocks include blocks that make up one or more files of an operating system that is installed in the source storage or of a software application that is installed in the source storage; and
    the one or more files of the operating system or the one or more files of the software application are stored in the vault storage in the sequence of a clean install of the operating system or of the software application, respectively.

19. The method as recited in claim 17, further comprising a restore phase which includes reading, from the vault storage, and storing, in a restore storage, each changed allocated block that was stored in the source storage at the second point in time in the same position as stored in the source storage after the completion of the defragmentation phase.

20. A non-transitory computer-readable medium storing a program that causes a processor to execute the method as recited in claim 17.

* * * * *